US012748197B2

(12) United States Patent
Hurwitz et al.

(10) Patent No.: US 12,748,197 B2
(45) Date of Patent: Sep. 29, 2026

(54) CONTINUOUS WAVE TIME OF FLIGHT SYSTEM

(71) Applicant: Analog Devices International Unlimited Company, Limerick (IE)

(72) Inventors: Jonathan Ephraim David Hurwitz, Edinburgh (GB); Nicolas Le Dortz, Palo Alto, CA (US); Erik D. Barnes, Cambridge, MA (US); Eoin E. English, Pallasgreen (IE)

(73) Assignee: Analog Devices International Unlimited Company, Limerick (IE)

( * ) Notice: Subject to any disclaimer, the term of this patent is extended or adjusted under 35 U.S.C. 154(b) by 765 days.

(21) Appl. No.: 18/030,940

(22) PCT Filed: Oct. 8, 2021

(86) PCT No.: PCT/EP2021/077946
§ 371 (c)(1),
(2) Date: Apr. 7, 2023

(87) PCT Pub. No.: WO2022/078914
PCT Pub. Date: Apr. 21, 2022

(65) Prior Publication Data

US 2023/0305123 A1 Sep. 28, 2023

Related U.S. Application Data

(60) Provisional application No. 63/090,877, filed on Oct. 13, 2020.

(51) Int. Cl.
*G01C 3/08* (2006.01)
*G01S 7/4911* (2020.01)
(Continued)

(52) U.S. Cl.
CPC .......... *G01S 7/4911* (2013.01); *G01S 7/4914* (2013.01); *G01S 17/36* (2013.01); *G01S 17/894* (2020.01)

(58) Field of Classification Search
CPC .... G01S 7/4911; G01S 7/4914; G01S 17/894; G01S 17/36
See application file for complete search history.

(56) References Cited

U.S. PATENT DOCUMENTS 4,204,278 A 5/1980 Nelson
2014/0218570 A1 8/2014 Payne et al.
(Continued)

FOREIGN PATENT DOCUMENTS

WO WO 2017138032 A1 * 8/2017 ............ G01S 7/497

OTHER PUBLICATIONS

"International Application Serial No. PCT/EP2021/077946, International Search Report mailed Feb. 1, 2023", 5 pgs.
(Continued)

*Primary Examiner* — Mark Hellner
(74) *Attorney, Agent, or Firm* — Schwegman Lundberg & Woessner, P.A.

(57) ABSTRACT

The disclosure provides different time of flight, ToF, methods and systems for using two or more non-sinusoidal control signals to achieve modulated output light and/or image sensor control with reduced harmonic content. In particular, the two or more non-sinusoidal control signals have different relative phase offsets or duty cycle ratios such that a combined signal resulting from combing the two or more control signals has reduced harmonic content. By utilising non-sinusoidal signals and effectively making using of the combined signal for the output light and/or image sensor control, the system is more straightforward and lower cost to implement compared with systems that use sinusoi-
(Continued)

dal control signals, whilst still maintaining accuracy of the system by minimising the harmonic noise normally associated with non-sinusoidal signals.

21 Claims, 9 Drawing Sheets

(51) Int. Cl.

| | |
|---|---|
| ***G01S 7/4914*** | (2020.01) |
| ***G01S 17/36*** | (2006.01) |
| ***G01S 17/894*** | (2020.01) |

(56) References Cited

U.S. PATENT DOCUMENTS

| | | | | |
|---|---|---|---|---|
| 2016/0116594 | A1* | 4/2016 | Xu | G01S 17/32<br>356/5.1 |
| 2017/0272651 | A1* | 9/2017 | Mathy | H04N 5/2226 |
| 2018/0175586 | A1* | 6/2018 | Branca | H01S 5/06216 |
| 2021/0033731 | A1* | 2/2021 | Xu | H04N 13/254 |
| 2022/0210357 | A1* | 6/2022 | Kye | G01S 7/4815 |

OTHER PUBLICATIONS

"International Application Serial No. PCT/EP2021/077946, Written Opinion mailed Feb. 1, 2023", 9 pgs.

* cited by examiner (a)

(b)

CONTINUOUS WAVE TIME OF FLIGHT SYSTEM

PRIORITY CLAIM

This application is a U.S. National Stage filing from PCT Application Serial No. PCT/EP2021/077946, filed Oct. 8, 2021, and published as WO 2022/078914 A1 on Apr. 21, 2022, which claims priority to U.S. Provisional Application Ser. No. 63/090,877, filed Oct. 13, 2020, the benefit of each of which is hereby presently claimed, and each of which are hereby incorporated by reference herein in their respective entireties.

BACKGROUND

Time-of-flight (ToF) camera systems are range imaging systems that resolve the distance between the camera and an object by measuring the round trip of light emitted from the ToF camera system. The systems typically comprise a light source (such as a laser or LED), a light source driver to control the emission of light from the light source, an image sensor to image light reflected by the subject, an image sensor driver to control the operation of the image sensor, optics to shape the light emitted from the light source and to focus light reflected by the object onto the image sensor, and a computation unit configured to determine the distance to the object based on the emitted light and the corresponding light reflection from the object.

In a Continuous Wave (CW) ToF camera system, multiple periods of a continuous light wave are emitted from the laser. The system is then configured to determine the distance to the imaged object based on a phase difference between the emitted light and the received reflected light. CW ToF systems often modulate the emitted laser light with a first modulation signal and determine a first phase difference between the emitted light and reflected light, before modulating the emitted laser light with a second modulation signal and determine a further phase difference between the emitted light and reflected light. A depth map/depth frame can then be determined based on the first and second phase differences. The first modulation signal and second modulation signals have different frequencies so that the first and second phase differences can be used to resolve phase wrapping.

SUMMARY

The disclosure provides different time of flight, ToF, methods and systems for using two or more non-sinusoidal control signals to achieve modulated output light and/or image sensor control with reduced harmonic content. In particular, the two or more non-sinusoidal control signals have different relative phase offsets or duty cycle ratios such that a combined signal resulting from combing the two or more control signals has reduced harmonic content. By utilising non-sinusoidal signals and effectively making use of the combined signal for the output light and/or image sensor control, the system is more straightforward and lower cost to implement compared with systems that use sinusoidal control signals, whilst still maintaining accuracy of the system by minimising the harmonic noise normally associated with non-sinusoidal signals.

In a first aspect of the disclosure, there is provided a system comprising: a light emission unit comprising: at least one light source; and two or more drivers coupled to the at least one light source, each configured to output a respective drive signal to the at least one light source to drive the at least one light source to emit light; a controller coupled to the light emission unit and configured to control a timing and a modulation of the two or more drive signals, wherein the controller is configured to output to the light emission unit a first modulated control signal and a second modulated control signal, the first modulated control signal and the second modulated control signal each having a fundamental component at a fundamental frequency and one or more harmonic components at one or more harmonic frequencies, and wherein the light emission unit is configured to emit light having a modulation resulting from a combination of the first modulated control signal and the second modulated control signal, the modulation of the output light having a fundamental component at the fundamental frequency and one or more harmonic components at the one or more harmonic frequencies, wherein the amplitude of at least one of the harmonic components of the output light is less than the amplitude of the corresponding harmonic components of the first modulated control signal and the second modulated control signal.

The first modulated control signal may have a first duty cycle ratio and the second modulated control signal may have a second duty cycle ratio that is different to the first duty cycle ratio. Additionally, or alternatively, a phase of the first modulated control signal may be offset relative to the second modulated control signal.

The first modulated control signal and the second modulated control signal may be square wave signals (sometimes also referred to as rectangular wave signals) or trapezoidal wave signals.

The output light may have a periodic oscillating modulation, oscillating between two energy levels and at least one intermediate energy level.

The two or more driver units may comprise: a first driver configured to output a first drive signal to the at least one light source; and a second driver configured to output a second drive signal to the at least one light source.

The at least one light source may comprise a single light source coupled to the first driver and the second driver, wherein the light emission unit is configured to combine the first drive signal and the second drive signal and drive the single light source using the combined signal.

Alternatively, the at least one light source may comprise: a first light source coupled to the first driver such that the first light source is driven by the first drive signal; and a second light source coupled to the second driver such that the second light source is driven by the second drive signal. The light emission unit may further comprise a diffuser through which light emitted by the first light source and the second light source passes.

The controller may be configured to: control the light emission unit to emit light for a first amount of time; output the first modulated control signal to the first driver for the first amount of time; and output the second modulated control signal to the second current driver for the first amount of time.

Alternatively, the controller may be configured to: control the light emission unit to emit light for a first amount of time; output the first modulated control signal to the first driver and output the second modulated control signal to the second driver for a first portion of the first amount of time; and output the first modulated control signal to the second driver and output the second modulated control signal to the first driver for a second portion of the first amount of time.

In a second aspect of the disclosure, there is provided a time of flight, ToF, camera system comprising: a light emission unit; an image sensor configured to image light emitted from the light emission unit and reflected by an object to be imaged; and a controller coupled to the light emission unit and the image sensor, the controller being configured to: apply a modulated light control signal to the light emission unit for a first amount of time to cause the light emission unit to output modulated light for the first amount of time; control charge accumulation of the image sensor for a first portion of the first amount of time using a first modulated signal; and control charge accumulation of the image sensor for a second portion of the first amount of time using a second modulated signal, wherein the first modulated signal and the second modulated signal have different duty cycle ratios.

The first portion of the first amount of time and the second portion of the first amount of time may together span the entire first amount of time.

Alternatively, the controller may be further configured to: control charge accumulation of the image sensor for a third portion of the first amount of time using the first modulated signal; and control charge accumulation of the image sensor for a fourth portion of the first amount of time using the second modulated signal. In this case, the first portion of the first amount of time, the second portion of the first amount of time, the third portion of the first amount of time and the fourth portion of the first amount of time may together span the entire first amount of time.

The different duty cycle ratios of the first modulated signal and the second modulated signal may be such that a combined signal, formed by combining the first modulated signal and the second modulated signal, has lower amplitude harmonic content than the modulated light control signal.

In a third aspect of the disclosure, there is provided a system comprising: a light source; a controller coupled to the light source and configured to control the light source to emit modulated light for a first amount of time, wherein the controller is configured to: control the light source to emit light with a first modulation signal for a first portion of the first amount of time, the first modulation signal having a first duty cycle ratio; and control the light source to emit light with a second modulation signal for a second portion of the first amount of time, the second modulation signal having a second duty cycle ratio that is different to the first duty cycle ratio, wherein the duty cycle ratios of the first modulation signal and the second modulation signal are such that at least one harmonic in a combined signal formed by combining the first modulation signal and the second modulation signal has a lower amplitude than the corresponding harmonic content in the first modulation signal and the second modulation signal.

The first portion of the first amount of time and the second portion of the first amount of time may together span the entire first amount of time.

Alternatively, the controller may be further configured to: control the light source to emit light with the first modulation signal for a third portion of the first amount of time; and control the light source to emit light with the second modulation signal for a fourth portion of the first amount of time. In this case, the first portion of the first amount of time, the second portion of the first amount of time, the third portion of the first amount of time and the fourth portion of the first amount of time together span the entire first amount of time.

The system may further comprise a driver, wherein the controller is coupled to the light source by the driver.

The system may be a ToF camera system and may further comprise an image sensor for light emitted from the light source and reflected by an object being imaged.

DRAWINGS

Aspects of the present disclosure are described, by way of example only, with reference to the following drawings, in which:

FIG. 3(*b*) is an example representation of the harmonic content of a square wave signal;

The drawings are schematic and representative only. They are not drawn to scale.

DETAILED DESCRIPTION

Controlling the light source and/or image sensor in a CW ToF system using a sinusoidal modulation signal can be advantageous as a sinusoidal signal has very little harmonic content such that most or all of the energy is at the fundamental frequency. However, sinusoidal signals can be difficult/costly to generate. Using a non-sinusoidal signal, such as a square wave signal, can be easier and less costly to generate, but they tend to suffer from significant harmonic content that can fold back into the measurement band of the system and reduce the accuracy of distance measurement. To address this issue, the inventors have developed various different ways in which two or more non-sinusoidal signals, such as two or more square wave or trapezoidal wave signals, can effectively be combined into a single modulated signal that approximates a sinusoidal signal and therefore has reduced harmonic energy compared with the two or more non-sinusoidal signals. The combined signals can effectively be combined in many different ways such that the light emitted by the system has a modulation corresponding to the combined signal and/or the image sensor charge accumulation timing is effectively controlled according to the combined signal modulation. Consequently, control of the operation of the CW ToF system may be simplified by using non-sinusoidal signals whilst still maintaining sufficient accuracy for the system by keeping harmonic content to an acceptable level.

Figure 1:
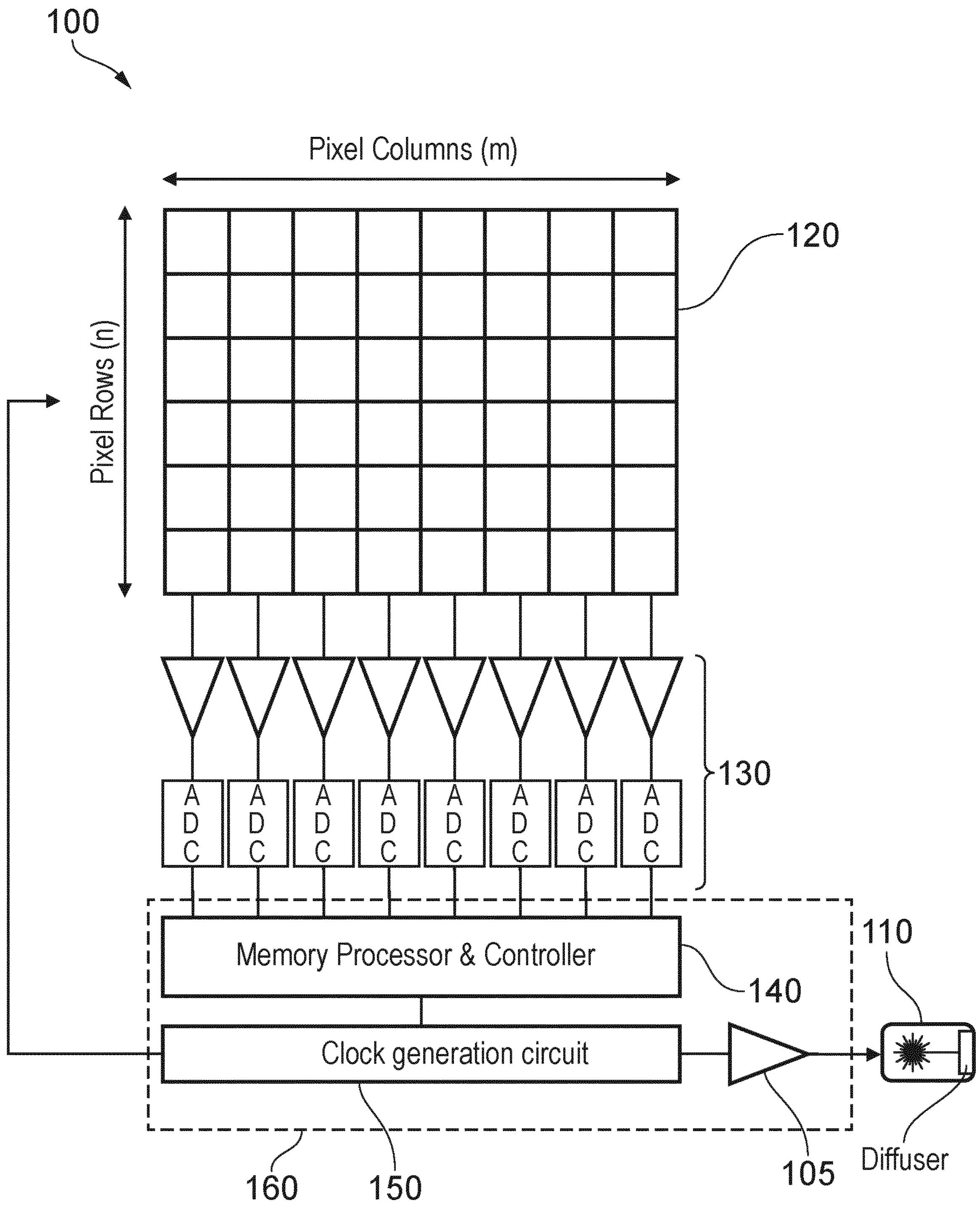
FIG. 1 is a schematic representation of a CW-ToF imaging system in accordance with an aspect of the present disclosure.

FIG. 1 shows an example representation of a CW ToF camera system 100. The system 100 comprises a laser 110 (which may be any suitable type of laser) and a laser driver 105 configured to drive the laser 110 into light emission.

The system 100 also comprises an imaging sensor 120 that comprises a plurality (in this case m×n) of imaging pixels. A converter system 130 (comprising a plurality of amplifiers and ADCs) is coupled to the imaging sensor 120 for reading off charge accumulated on the imaging pixels and converting to digital values, which are output to the memory processor & controller 140. The nature of the values read out from the imaging sensor 120 will depend on the technology of the imaging sensor 120. For example, if the imaging sensor is a CMOS sensor, voltage values may be readout, where each voltage value is dependent on the charge accumulated in an imaging pixel of the imaging sensor 120, such that the readout values are each indicative of charge accumulated in imaging pixels of the imaging sensor 120. In other sensor technologies, the nature of the readout values may be different, for example charge may be directly readout, or current, etc. The memory processor & controller 140 is configured to determine depth frames (also referred to as depth maps), indicative of distance to the object being imaged, based on the received digital values indicative of charge accumulated on the imaging pixels. The memory processor & controller 140 may also be configured to determine active brightness frames (also referred to as 2D IR frames/images). The memory processor & controller 140 controls a clock generation circuit 150, which outputs timing signals for driving the laser 110 and for reading charge off the imaging sensor 120. The converter system 130, memory processor & controller 140 and clock generation circuit 150 may together be referred to as an image acquisition system, configured to determine one or more depth frames by controlling the laser 110, reading off the image sensor 120 and processing the resultant data.

Figure 2:
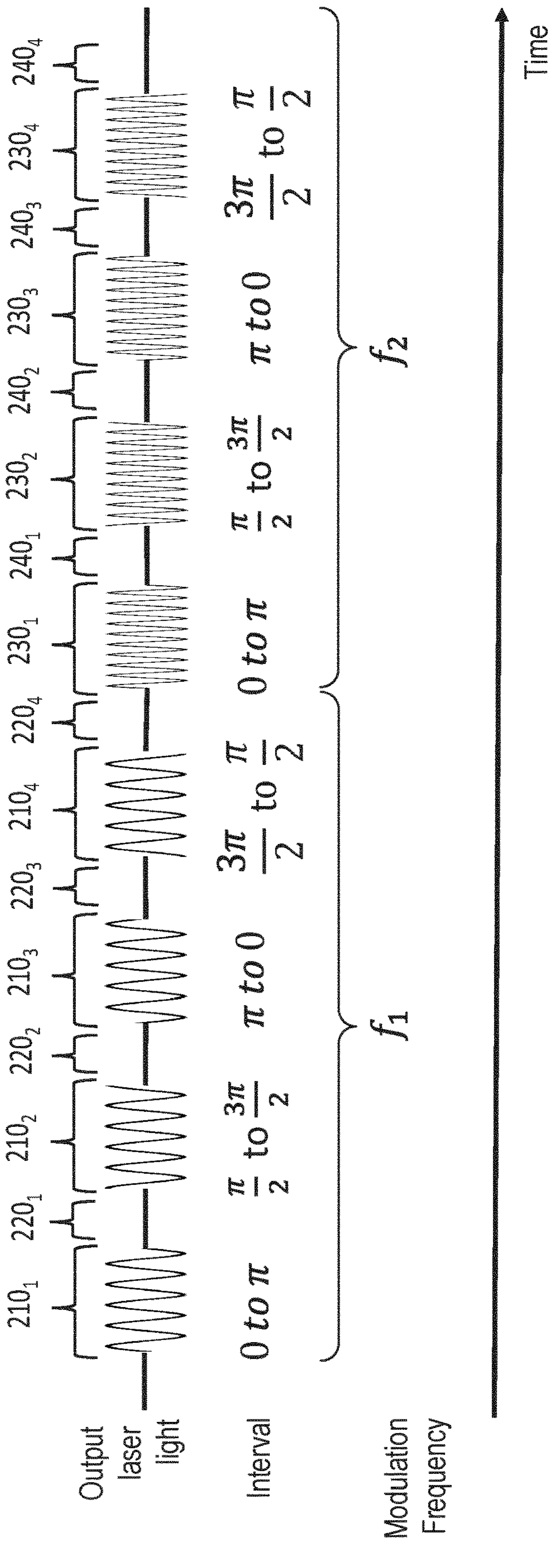
FIG. 2 is a schematic representation of how the CW-ToF imaging system of FIG. 1 may be operated to accumulate and readout charge from the imaging sensor.

FIG. 2 shows an example schematic diagram to help explain the operation of the system 100. The memory processor & controller 140 and clock generation circuit 150 control the laser 110 to output first laser light modulated by a first modulation signal having a first frequency $f_1$ for an accumulation period of time 210$_1$. During this period of time, some of the first laser light reflected from the object will be incident on the imaging sensor 120. During the accumulation period of time 210$_1$, the memory processor & controller 140 and clock generation circuit 150 also controls the imaging sensor 120 to accumulate charge based on the incident reflected first laser light for the first part/interval of the period/cycle of the first laser light (0° to 180°, or 0 to $\pi$). For example, the imaging sensor 120 is controlled to "open its shutter" for charge accumulation at the times when the phase of the emitted first laser light is between 0° to 180°. This is so that the phase of the received first laser light relative to the emitted first laser light at a first interval of 0 to $\pi$ may later be determined using the charge accumulated on the imaging sensor 120, for example by cross correlating the accumulated charge signal with the first modulation signal. In this example, accumulation takes place for half of the period/cycle of the first laser light, but may alternatively take place for any other suitable amount of time, for example for one quarter of the phase of the first laser light. The skilled person will readily understand how to control the accumulation timing of the imaging sensor 120 using control signals based on the timing of the laser modulation signal. As will be understood by the skilled person, if the image sensor 120 is a single ended pixel type, the pixels may be controlled to accumulate charge for this part/interval of the period and not accumulate any charge for the remainder of the period. If the image sensor 120 is a differential pixel type, the pixels may be controlled to accumulate charge for this part/interval of the period on one side of the pixel and accumulate charge on the other side of the pixel for the remainder of the period. This also applies to the other accumulation parts/intervals described later.

During a subsequent read out period of time 220$_1$, the memory processor & controller 140 and clock generation circuit 150 control the first laser 110$_1$ to cease emitting light and control readout image sensor values that are indicative of the charge accumulated in the imaging pixels of the imaging sensor 120. The nature of the readout values will depend on the technology of the imaging sensor 120. For example, if the imaging sensor is a CMOS sensor, voltage values may be readout, where each voltage value is dependent on the charge accumulated in an imaging pixel of the imaging sensor 120, such that the readout values are each indicative of charge accumulated in imaging pixels of the imaging sensor 120. In other sensor technologies, the nature of the readout values may be different, for example charge may be directly readout, or current, etc. For example, the imaging sensor 120 may be controlled to readout image sensor values from row-by-row using any standard readout process and circuitry well understood by the skilled person. In this way, a sample of charge accumulated by each imaging pixel during the period 210$_1$ may be read off the imaging sensor 120, converted to a digital value and then stored by the memory processor & controller 140. The group of values, or data points, arrived at the conclusion of this process is referred to in this disclosure as a charge sample.

It will be appreciated that the accumulation period of time 210$_1$ may last for multiple periods/cycles of the first modulation signal (as can be seen in FIG. 1) in order to accumulate sufficient reflected light to perform an accurate determination of the phase of the received reflected light relative to the first modulation signal, for the interval 0 to $\pi$ of the first modulation signal.

During accumulation period of time 210$_2$, the memory processor & controller 140 and clock generation circuit 150 again control the first laser 110$_1$ to output first laser light modulated by the first modulation signal for an accumulation period of time 210$_2$. This is very similar to the accumulation period 210$_1$, except during accumulation period of time 210$_2$ the memory processor & controller 140 and clock generation circuit 150 controls the imaging sensor 120 to accumulate charge for the second part/interval of the period/cycle of the first modulation signal (90° to 270°, or $\pi/2$ to $3\pi/2$). The read out period 220$_2$ is very similar to period 220$_1$, except the obtained charge sample relates to a shifted or delayed interval of $\pi/2$ to $3\pi/2$ of the first modulation signal.

Accumulation period of time 210$_3$ is very similar to the period 210$_2$, except the memory processor & controller 140 and clock generation circuit 150 controls the imaging sensor 120 to accumulate charge for the third part/interval of the period/cycle of the first modulation signal (180° to 360°, or $\pi$ to $2\pi$). The read out period 220$_3$ is very similar to period 220$_2$, except the sampled charge data relates to a shifted or delayed interval of $\pi$ to $2\pi$ of the first modulation signal.

Finally, accumulation period of time $210_4$ is very similar to the period $210_3$, except the memory processor & controller 140 and clock generation circuit 150 also controls the imaging sensor 120 to accumulate charge based on the incident reflected first laser light for a fourth part/interval of the period/cycle of the first modulation signal (270° to 90°, or 3π/2 to π/2). The read out period $220_4$ is very similar to period $220_3$, except the charge sample relates to a shifted or delayed interval of 3π/2 to π/2 (or, put another, a shifted or delayed interval of 3π/2 to 5π/2).

It can be seen from the above that for each accumulation period $210_1$-$210_4$, the start timing of pixel accumulation timing relative to the laser modulation signal is shifted (i.e., the relative phase of the laser modulation signal and the pixel demodulation signal, which controls pixel accumulation timing, is shifted). This may be achieved either by adjusting the pixel demodulation signal or by adjusting the laser modulation signal. For example, the timing of the two signals may be set by a clock and for each of the accumulation periods $210_1$-$210_4$, either the laser modulation signal or the pixel demodulation signal may be incrementally delayed by π/2.

Whilst in this example each accumulation period $210_1$-$210_4$ lasts for 50% of the period of the laser modulation signal (i.e., for 180°), in an alternative each accumulation period may be shorter, for example 60°, or 90°, or 120°, etc, with the start of each accumulation period relatively offset by 90° as explained above.

After completing this, four samples of data (charge samples) have been acquired and stored in memory. They together may be referred to as a first set of charge samples. Immediately after the read out period $220_4$, or at some later time, a phase relationship between the first laser light and the received reflected light may be determined using the four charge samples (for example by performing a discrete Fourier transform (DFT) on the samples to find the real and imaginary parts of the fundamental frequency, and then determining the phase from the real and imaginary parts, as will be well understood by the skilled person). This may be performed by the image acquisition system, or the charge samples may be output from the image acquisition system to an external processor via a data bus for the determination of the phase relationship. Optionally, active brightness (2D IR) may also be determined (either by the image acquisition system or the external processor) for the reflected first laser light using the four samples (for example, by determining the magnitude of the fundamental frequency from the real and imaginary parts, as will be well understood by the skilled person).

The skilled person will readily understand that using DFT to determine the phase relationship between the first laser light and the received reflected laser light, and to determine active brightness, is merely one example and that any other suitable alternative technique may be used. By way of brief explanation a further non-limiting example is now described.

The transmitted, modulated laser signal may be described by the following equation:

$$s(t)=A_s \sin(2\pi f t)+B_s$$

Where:

s(t)=optical power of emitted signal f=laser modulation frequency $A_s$=amplitude of the modulated emitted signal $B_s$=offset of the modulated emitted signal The signal received at the imaging sensor may be described by the following equation:

$$r(t) = \alpha(A_s \sin(2\pi f t + \Phi) + B_s) + B_{env}$$

$$\Phi = 2\pi f \Delta$$

$$\Delta = \frac{2d}{c}$$

Where:

r(t)=optical power of received signal

α=attenuation factor of the received signal

ϕ=phase shift $B_{env}$=amplitude of background light

Δ=time delay between emitted and received signals (i.e., time of flight)

d=distance to imaged object c=speed of light

Accumulation timing of the imaging pixels may be controlled using a demodulation signal, g(t−τ), which is effectively a time delayed version of the illumination signal.

$$g(t-\tau)=A_g \sin(2\pi f(t-\tau))+B_g$$

Where:

τ=a variable delay, which can be set to achieve the phase delays/offsets between each accumulation period $210_1$-$210_4$ described above $A_g$=amplitude of the demodulation signal $B_g$=offset of the demodulation signal The imaging pixels of the imaging sensor effectively multiply the signals r(t) and g(t−τ). The resulting signal may be integrated by the imaging pixels of the imaging sensor to yield a cross correlation signal c(τ):

$$c(\tau)=A \sin(2\pi f(t-\tau))+B$$

By driving the imaging sensor to accumulate at different offsets during different accumulation periods, as described above, it is possible to measure correlation at different time offsets τ (phase-offsets φ) 0, π/2, π, 3π/2:

$$c(\tau) = A\sin(2\pi f(t-\tau)) + B = A\sin(\Phi - \varphi) + B$$

$$c(\tau) = A(\sin(\Phi)\cos(-\varphi) + \cos(\Phi)\sin(-\varphi)) + B$$

$$c(0) = A1 = A(\sin(\Phi)) + B$$

$$c\left(\frac{\pi}{2}\right) = A2 = -A(\cos(\Phi)) + B$$

$$c(\pi) = A3 = -A(\sin(\Phi)) + B$$

$$c\left(\frac{3\pi}{2}\right) = A4 = A(\cos(\Phi)) + B$$

From these readings, it can be determined that the phase offset/time of flight can be found by:

$$\Phi = 2\pi f \Delta = \arctan\left(\frac{\sin(\Phi)}{\cos(\Phi)}\right) = \operatorname{atan}\left(\frac{A1 - A3}{A4 - A2}\right)$$

Therefore, a depth image or map can be determined using the four charge samples acquired from the image sensor.

An active brightness, or 2D IR, image/frame may also be determined by determining $\sqrt{(A4-A2)^2+(A1-A3)^2}$.

Subsequently, the process described earlier in relation to periods $210_1$-$210_4$ and $220_1$-$220_4$ may then be repeated in accumulation periods $230_1$-$230_4$ and read out periods $240_1$-$240_4$. These are the same as the accumulation periods $210_1$-$210_4$ and read out periods $220_1$-$220_4$, except rather than driving the laser $110_1$ to emit light modulated with the first modulation signal, the laser 110 is driven to emit light modulated with a second modulation signal. The second modulation signal has a second frequency $f_2$, which is higher than the first frequency $f_1$. As a result, four further samples of data (charge samples) are obtained and stored in memory. Based on these charge samples, a phase relationship between the second laser light and the received reflected light (and optionally also the active brightness for the reflected second laser light) may be determined either by the image acquisition system or the external processor, for example using DFT or correlation function processes as described above.

Using the determined phase relationship between the first laser light and the received reflected light and the determined phase relationship between the second laser light and the received reflected light, phase unwrapping may be performed and a single depth image/frame determined by the memory processor & controller 140 (as will be understood by the skilled person). In this way, any phase wrapping issues can be resolved so that an accurate depth frame can be determined. This process may be repeated many times in order to generate a time series of depth frames, which may together form a video.

Optionally, a 2D IR frame may also be determined using the determined active brightness for the first laser light and the determined active brightness for the second laser light.

In this example, there are four accumulation periods for each laser modulation frequency, each accumulation period being at a different phase offset relative to the laser modulation signal. This may be referred to as four times oversampling. However, in a different example there may be a different number of accumulation periods per frequency, such as two, three, six, eight, etc. Typically, larger numbers of different accumulation periods (each at a different phase offset relative to the laser drive signal) reduces the number of harmonics that fold back into the fundamental frequency (as will be understood from Nyquist sampling theory), which in turn reduces noise. This is briefly explained below.

Whilst FIG. 2 represents the laser light modulation signal as a sinusoidal (sine) signal, it may alternatively be a square wave signal. If the clock generation circuit 150 drives the laser 110 with a sinusoidal modulation signal, there is a benefit that sine signals typically have a low harmonic content, with most if not all energy being at the fundamental frequency of the laser drive signal. However, pure sine signals can be relatively complex to generate, typically requiring high speed DACs and/or resonant circuits.

If the clock generation circuit 150 drives the laser 110 with a square wave modulation signal, there is a benefit that the signal is more straightforward to generate. However, square wave signals typically have more harmonic content than sine signals, much of which may fold back into the measurement band of the system. This may result in errors in the signal of interest, thereby reducing accuracy.

Figure 3:
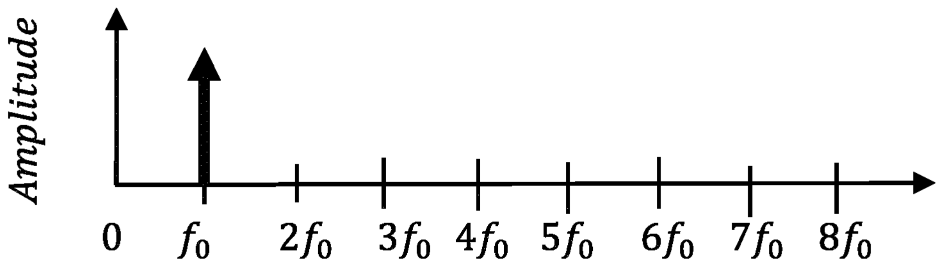
FIG. 3(*a*) is an example representation of the harmonic content of a pure sine wave signal.
Figure 3:
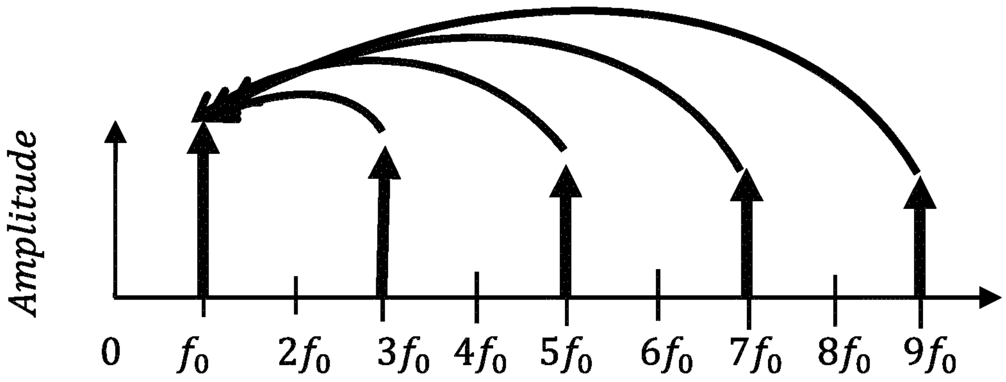

FIG. 3 shows a representation of frequency content to help explain this. Graphic (a) represents the frequency content of a pure sine wave. As can be seen, all of the content is at the fundamental frequency $f_0$. Graphic (b) shows the frequency content for an ideal square wave signal. As can be seen, there is harmonic content at odd integer multiples of the fundamental frequency $f_0$, for example at $3f_0$, $5f_0$, $7f_0$, etc. It will be understood from Nyquist theory that at least some of these odd harmonics will fold back onto the modulation frequency bin, which may result in errors in the depth measurements (i.e., the depth images) determined by the ToF camera system. For example, where four times oversampling is used (as is the case in FIG. 2 described above), the harmonics $3f_0$, $5f_0$, $7f_0$ will fold back into the fundamental frequency. If higher oversampling is used (for example six or eight times), fewer harmonics may fold back into the fundamental. However some harmonics will nevertheless still fold back into the fundamental, and it may be undesirable to increase oversampling as it increases the amount of time required to acquire a depth frame, which may result in motion blurring within the depth frame and increase power consumption. Whilst in an ideal square wave there should not be any even integer harmonics, eg $2f_0$, $4f_0$, at some rates of oversampling even if there were (due to non-idealities) they should fold back to 0 (eg, DC), whereas for other rates of oversampling they may fold back to the fundamental frequency. Therefore, it is not necessarily just odd integer harmonics that could fold back to the fundamental frequency and cause errors in the depth measurements.

The inventors have developed a number of techniques for driving the laser 110 with non-sinusoidal signals, such as square wave signal(s), whilst reducing the amplitude/size of the harmonic content, thereby minimising their negative effects. As a result, the ToF camera system may realise the benefits of using a square wave modulation signal (for example, improved simplicity of signal generation) whilst minimising any reduction in measurement accuracy. Furthermore, it may also be possible to reduce the amount of oversampling required (for example, reducing to two times oversampling) because the amplitude/size of the harmonics is reduced, thereby reducing the need to minimise the number of harmonics that fold back into the fundamental frequency.

Signals with Different Duty Cycles

Figure 4:
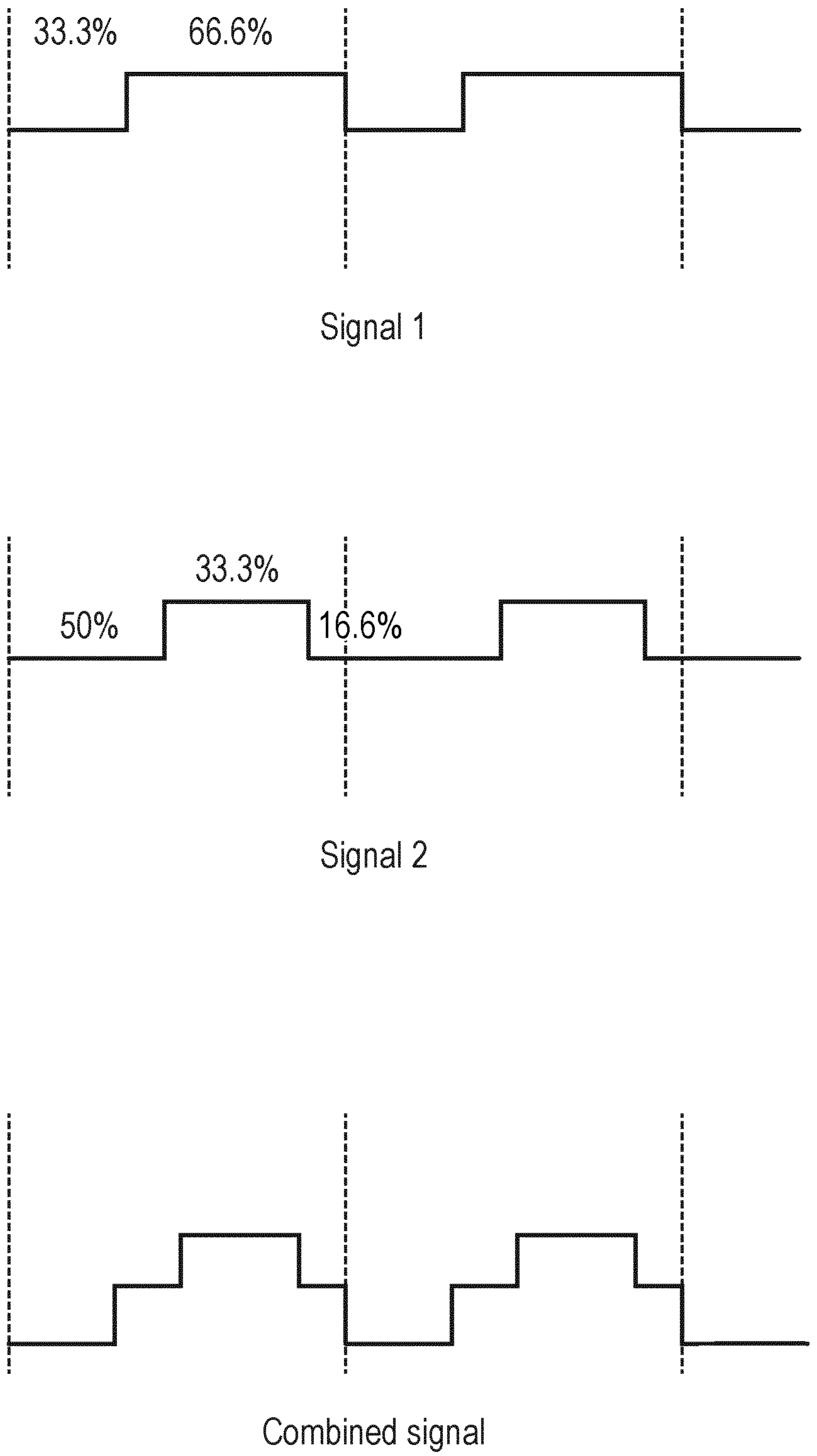
FIG. 4 is an example representation of combining two signals with different duty cycle ratios to create a combined signal, in accordance with an aspect of the present disclosure.

FIG. 4 shows a representation of two different signals with different duty cycles, but the same frequency. Signal 1 has a duty cycle of 1:2 (Low:high), which means that for ⅓ of the period of the signal, the signal is low and for ⅔ of the period of the signal, the signal is high. Signal 2 is the same frequency as signal 1, but has a duty cycle of 2:1 (low:high), such that for ⅔ of the period of the signal, the signal is low and for ⅓ of the period of the signal, the signal is high. By correctly aligning the timing of the two signals relative to one another, the combination of the two signals approximates/synthesises a sine signal having the same fundamental frequency as signal 1 and signal 2. As can be seen, the combined signal approximates/synthesises a sine signal by oscillating between two energy levels (eg, between two extreme energy levels, or max and min) and at least one intermediate energy level (eg, between the two extreme energy levels), such that the combined signal is closer in nature to a sinusoidal signal compared with the two square wave signals Signal 1 and Signal 2. As a result, by combining two different square wave signals in this way, a sinusoidal illumination signal may be approximated such that the amplitude of at least some of the harmonic content in the combined signal is lower than the amplitude of the corresponding harmonic content in the first and second signals. The charge accumulation timing described earlier with reference to FIG. 2 may be controlled using a 1:1 duty cycle square wave signal at the same frequency as signal 1, signal 2 and the combined signal, with appropriate timing alignment relative to signals 1 and 2 to achieve the desired charge accumulation timing. That signal is sometimes referred to below as the 'demodulation' signal. Whilst in this example two signals are combined to approximate/synthesise the sine signal, it will be appreciated that any number of signals with appropriate duty cycles may be combined to approximate/synthesise a sine signal. Typically, the larger the number of signals that are being combined, the more closely the combined signal may approximate a sine signal, but the more complex the signal generation and control may be. Therefore, the number of signals that are used may be chosen based on the requirements of the ToF camera system.

The different duty cycle signals may be combined in a number of different ways, as explained below.

Figure 5:
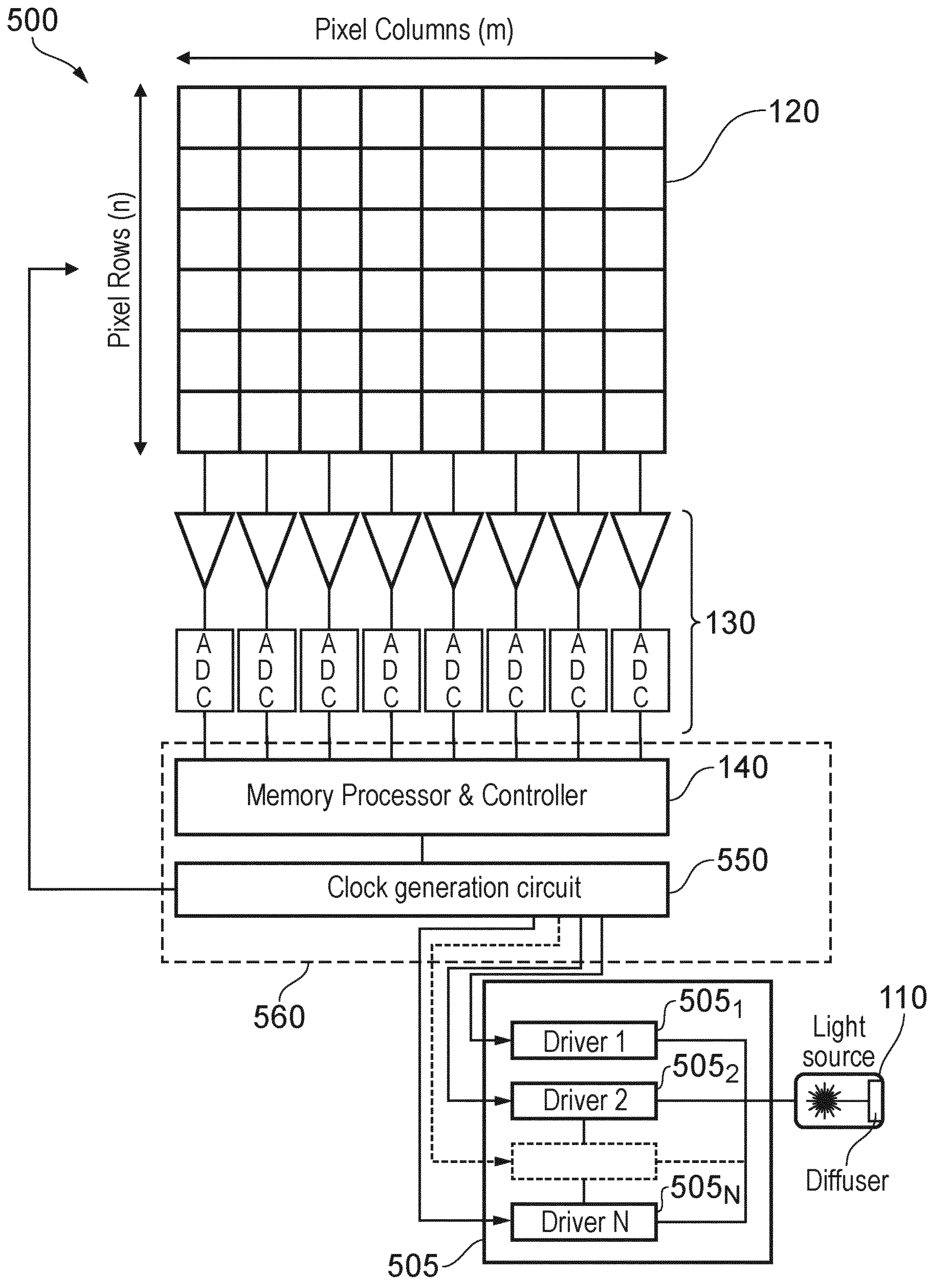
FIG. 5 is a schematic representation of a further CW-ToF imaging system in accordance with an aspect of the present disclosure.

FIG. 5 shows an example representation of a ToF camera system 500 in accordance with an aspect of the present disclosure. In this example, the clock generation circuit 550 is configured to generate N different signals with appropriately different duty cycles. The duty cycle and timing of the N different signals is controlled by the clock generation circuit 150 such that when they are combined, the combined signal approximates a sine signal. The laser driver 505 comprises N different drivers $\mathbf{505}_N$ to receive the N different signals from the clock generation circuit 550. In the example represented in FIG. 3 where only two signals are combined, N=2 such that the laser driver 505 may comprise only two drivers $\mathbf{505}_1$ and $\mathbf{505}_2$, Driver 1 receiving Signal 1 and Driver 2 receiving Signal 2. The outputs of the drivers $\mathbf{505}_N$ are combined at the input to the laser 110, such that the light output from the laser will be modulated by the combined signal. An additional benefit of this configuration is that by using multiple drivers $\mathbf{505}_N$ within the laser driver 505, the optical power output from the laser 110 may be increased, which may increase the range and/or accuracy of the ToF camera system 500. Whilst all of the multiple drivers $\mathbf{505}_N$ are represented as being within the same laser driver 505, in an alternative some or all of the multiple drivers $\mathbf{505}_N$ may be separate driver devices (for example, separate driver chips). The laser driver 505 and the laser 110 in combination may be seen as a light emission unit that is configured to receive control signals and output light with a timing and modulation dictated by the control signals.

Optionally, the signals output by the system 560 (which may also be referred to as a controller 560, since it controls the operation of the laser 110 and the image sensor 120) to the drivers $\mathbf{505}_N$ may rotate or cycle between the drivers $\mathbf{505}_N$. For example, modulated control signal 1 in FIG. 4 may be output to driver 1 $\mathbf{505}_1$ and modulated control signal 2 in FIG. 4 may be output to driver 2 $\mathbf{505}_2$ for an amount of time (for example, for n periods of signal 1 and signal 2). The signals may then rotate or cycle so that modulated control signal 1 is output to driver 2 $\mathbf{505}_2$ and modulated signal 2 is output to driver 1 $\mathbf{505}_1$ for a further amount of time (for example, for a further n periods of signal 1 and signal 2). In this example, the total light emission period, for example corresponding to one of the accumulation periods $\mathbf{210}_1$-$\mathbf{210}_4$ and $\mathbf{230}_1$-$\mathbf{230}_4$ described earlier, may last for 2n periods, or each accumulation period may last for n periods with the switch/rotation between drivers happening after each accumulation period. In the example where there are only two signals and two drivers, the two signals may effectively chop back and forth between the drivers in this way. Where there are three or more signals output to three or more drivers, the signals may rotate or cycle through all of the drivers in this way. Benefits of cycling the signals in this way may include compensating for mismatches in offset and/or gain and/or delay in the drivers $\mathbf{505}_N$ and the signal paths through which the driver signals pass.

Figure 6:
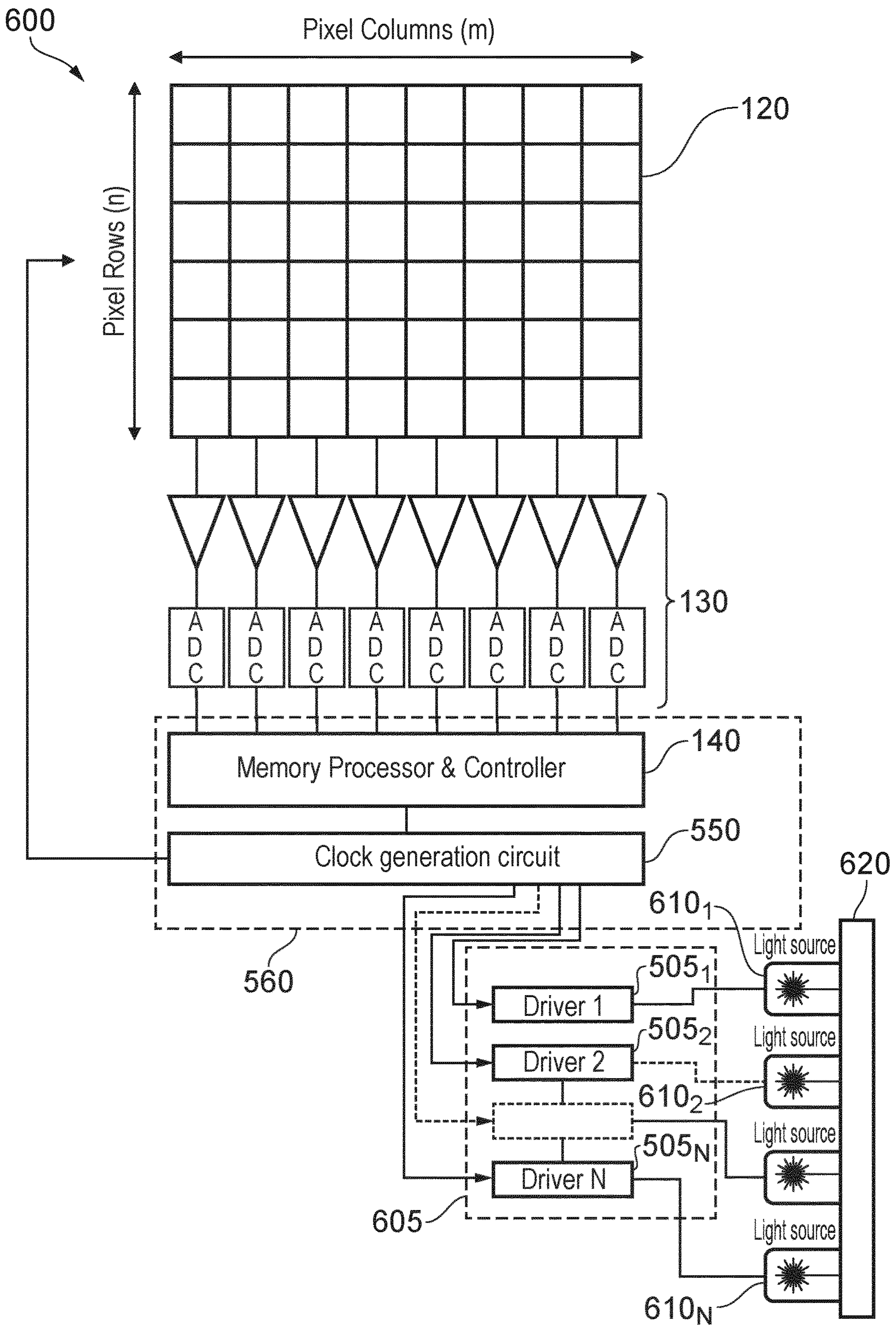
FIG. 6 is a schematic representation of a further CW-ToF imaging system in accordance with an aspect of the present disclosure.

FIG. 6 shows an example representation of a ToF camera system 600 in accordance with a further aspect of the present disclosure. This aspect is similar to that of FIG. 5, but rather than multiple drivers $\mathbf{505}_N$ driving a single laser, each driver $\mathbf{505}_N$ may drive a corresponding laser $\mathbf{610}_N$. The outputs of the lasers $\mathbf{610}_N$ may pass through an optical diffuser 620, such that a homogenous distribution of light from each of the lasers may be achieved over the field of view of the ToF camera system 600. The laser driver 605, the lasers $\mathbf{610}_N$ and the optical diffuser 620 in combination may be seen as a light emission unit that is configured to receive control signals and output homogenous light with a timing and modulation dictated by the control signals. The homogenous distribution of light will combine each of the light signals output from the lasers $\mathbf{610}_N$ such that the light effectively has the modulation of the combined signal described earlier. An additional benefit of this configuration is that the total optical power output from the system may be considerably increased, which may increase the range and/or accuracy of the ToF camera system 500.

The drivers $\mathbf{505}_N$ are represented as being part of a grouping 605 in FIG. 6. In some examples, the grouping 605 may be a driver unit that includes all of the individual drivers $\mathbf{505}_N$. In other examples, each of the drivers $\mathbf{505}_N$ may be separate, individual devices and the grouping 605 be omitted from FIG. 6.

Optionally, the signals output by the controller 560 to the drivers $\mathbf{505}_N$ may rotate or cycle between the drivers $\mathbf{505}_N$, as described above with reference to FIG. 5. In the example of FIG. 6, this may have an even further benefit of helping to reduce harmonic content caused by parallax between the different lasers $\mathbf{610}_N$.

The amplitudes the signals output by the drivers $\mathbf{505}_N$ may all be the same, or one or more of the signals may have a different weighting/amplitude. For example, if there are three or more drivers $\mathbf{505}_N$, the one or more drivers that are outputting a signal particularly contributing to the region of steepest gradient of the synthesised sine signal may output a larger amplitude signal than the other drivers so that the combined signal more closely approximates the shape of a sine signal. In this case, if the signals rotate or cycle between the drivers $\mathbf{505}_N$ then the differing amplitudes should also cycle/rotate between the drivers, for example by preconfiguring the drivers $\mathbf{505}_N$ with different amplitude/weight settings to switch between for each change in the cycle/rotation, or by controlling the drivers to reconfigure the amplitude/weighting of their outputs as necessary each time the cycle/rotation shifts.

In each of the aspects represented in FIGS. 5 and 6 the ToF camera system is configured to output illumination light having a modulation that results from a combination of the two or more different modulated control signals generated by the clock generation circuit 550, such that the harmonic content of the output light is lower than that of the square wave signals. However, the inventors have recognised that owing to the integrating effect of the image sensor 120, it is possible to output light, at any given time, that is modulated with a single one of the signals generated by the clock generation circuit 550 and still achieve the effects described herein.

As explained earlier with reference to FIG. 2, there may be multiple accumulation periods of time $\mathbf{210}_1$-$\mathbf{210}_4$ and $\mathbf{230}_1$-$\mathbf{230}_4$ in order to generate a depth frame. Each of the accumulation periods of time may be sub-divided and the ToF camera system may output light modulated with a first signal having a first duty cycle for a first part/portion of the accumulation period of time and output light modulated with a second signal having a second duty cycle for a second part/portion of the accumulation period of time.

Figure 7:
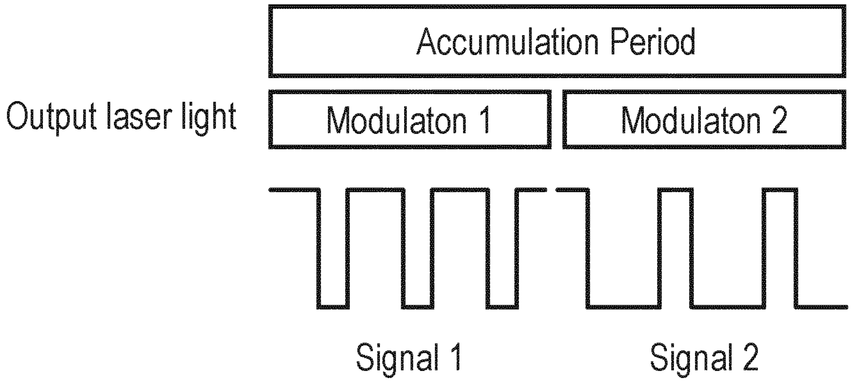
FIG. 7 is an example representation of a way in which two signals with different duty cycle ratios may be combined, in accordance with an aspect of the present disclosure.

FIG. 7 shows an example of this technique. Represented in FIG. 7 is an accumulation period, which could be any of the accumulation periods $\mathbf{210}_1$-$\mathbf{210}_4$ and $\mathbf{230}_1$-$\mathbf{230}_4$ described earlier. In this example, for 50% of the accumulation period, the laser light is modulated with signal 1 described earlier with reference to FIG. 4. For the remaining 50% of the accumulation period, the laser light is modulated with signal 2. In other words, if the accumulation period is to last for N cycles of a modulation signal, modulation 1 may last for N/2 cycles of signal 1, and modulation 2 may last for N/2 cycles of signal 2. Because of the integrating nature of the image sensor 120, the overall effect at the end of the accumulation period is superposition of the two signals, such that the result is the same as if signal 1 and signal 2 had been combined and the combined signal used to drive the laser 110. Therefore, the effects of unwanted harmonics associated with square wave signals may be reduced or even eliminated by controlling the output laser light in this way. The accumulation timing of the image sensor 120 may be controlled using a signal with the same frequency as signal 1 and signal 2, but with a duty cycle of 1:1.

Whilst in this example two signals with different duty cycle are used, and the accumulation period is split in two, the same technique may be employed with any number of different signals and the accumulation period may be split into any number of appropriate sub-divisions.

Figure 8:
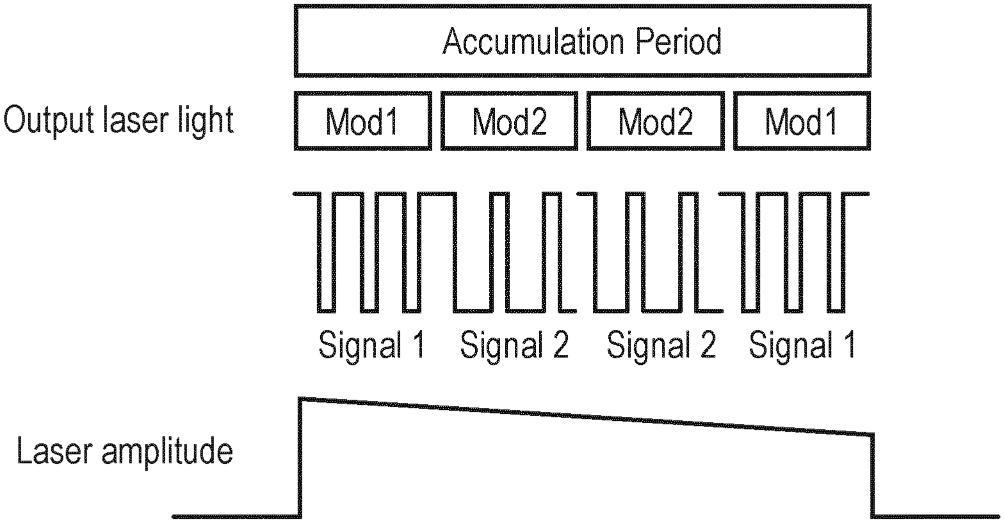
FIG. 8 is an example representation of a further way in which two signals with different duty cycle ratios may be combined, in accordance with an aspect of the present disclosure.

FIG. 8 shows an example where two signals are once again used (in this example, signal 1 and signal 2), but the accumulation period is sub-divided into four parts. For the first 25% of the accumulation period (eg, for N/4 cycles), the output laser light may be modulated with signal 1. For the next 50% of the accumulation period (eg, for N/2 cycles), the output laser light may be modulated with signal 2. For the final 25% of the accumulation period (eg, for N/4 cycles), the output laser light may be modulated with signal 1. By sub-dividing the accumulation period in this way, a common centroid may be achieved, which may be useful in compensating for other effects, such as the effect that is sometimes observed where the amplitude of laser light decreases over the course of the accumulation period. It will be appreciated that further sub-divisions (for example, six, or eight, or ten, etc sub-divisions) are possible.

In a further example, three or more different signals may be used, with the accumulation period sub-divided as appropriate. For example, three different signals may be used, with the accumulation period sub-divided into three parts, or six parts, or nine parts, etc.

The techniques represented in FIGS. 7 and 8 may be applied to any of the ToF camera systems represented in FIG. 1, 5 or 6. For example, for ToF camera system 100, the clock generation circuit 150 could consecutively drive the laser driver 105 with each different signal. Alternatively, for ToF camera system 500 or 600, the clock generation circuit 550 could consecutively output signal 1 to driver $505_1$, and then output signal 2 to drive $505_2$ and turn off signal 1, etc. Furthermore, in the examples of FIGS. 5 and 6, the driver signals may rotate or cycle between the drivers $505_N$ as described earlier, in which case any desired differences between amplitude/weighting of the different signals output from each driver should also rotate or cycle with the signals, also as described earlier.

Optionally, in the examples described above with reference to FIGS. 7 to 8, each signal (eg, signal 1, signal 2) is used for an equal amount of time during the accumulation period. In an alternative implementation, the relative amount of time for which each signal is used may be varied, in order to alter the combined signal and provide compensation of any distortions in the signals (for example, a rising edging the signal 1 or signal 2 may not be a perfect step and may have a slew rate. If one of the signals has a small duty cycle, the slew rate may have a relatively large effect on the overall signal. Therefore, that signal may be used for a longer period of time than the other signal in order to provide compensation). In this way, the combined signal may more accurately approximate/synthesise a sine signal.

In the examples described above with reference to FIGS. 7 to 8, the laser 110 is driven with different signals (eg, signal 1, signal 2) in order to approximate a sine wave signal, and the accumulation timing of the image sensor 120 is typically controlled using an appropriately timed 1:1 duty ratio square wave signal (the demodulation signal). However, in an alternative, the laser 110 may be driven with a 1:1 duty ratio square wave signal (or any other suitable signal), with the accumulation timing of the image sensor 120 controlled using the different signals (eg, signal 1, signal 2) to approximate a sine wave signal. By way of example, in the arrangements described with reference to FIGS. 7 and 8, instead of driving the laser 110 with signal 1 for a total of about 50% of the accumulation period (subject to any change for distortion compensation) and driving the laser 110 for the remainder of the accumulation period, the laser 110 may be driven with a 1:1 duty ratio square wave signal (or any other desired duty ratio) for the entirety of the accumulation period, with the accumulation timing of the image sensor 120 controlled using signal 1 for a total of about 50% of the accumulation period (subject to any change for distortion compensation) and signal 2 for the remainder of the accumulation period the different signals. The timings of when signal 1 and signal 2 are applied to the image sensor 120 may be controlled relative to the laser driver signal in order to achieve the desired charge accumulation timing relative to the laser driver signal (for example, in order to achieve the accumulation period timings described earlier with reference to FIG. 2). Owing to the integrating nature of the image sensor 120, by using signal 1 for part of an accumulation period and signal 2 for another part of the accumulation period, it should result in the two signals effectively being combined over the integrating period resulting in the same effect as the duty cycle implementation represented in FIGS. 7 and 8 (i.e., the reduction or suppression of harmonics associated with square wave signals that may otherwise fold back into the fundamental frequency). Therefore, it will be appreciated that the use of different duty cycle signals to synthesise a sine wave signal may be applied to the laser light emission, or to the image sensor accumulation control (i.e., image sensor demodulation).

Signals with Different Phase Offsets

In the above examples, it is explained how two or more different signals with different duty cycles may be used to synthesise/approximate a sine wave signal. In an alternative, two or more signals with different phase offsets (and either the same duty cycles, or different duty cycles) may be used to synthesise/approximate a sine wave signal.

Figure 9:
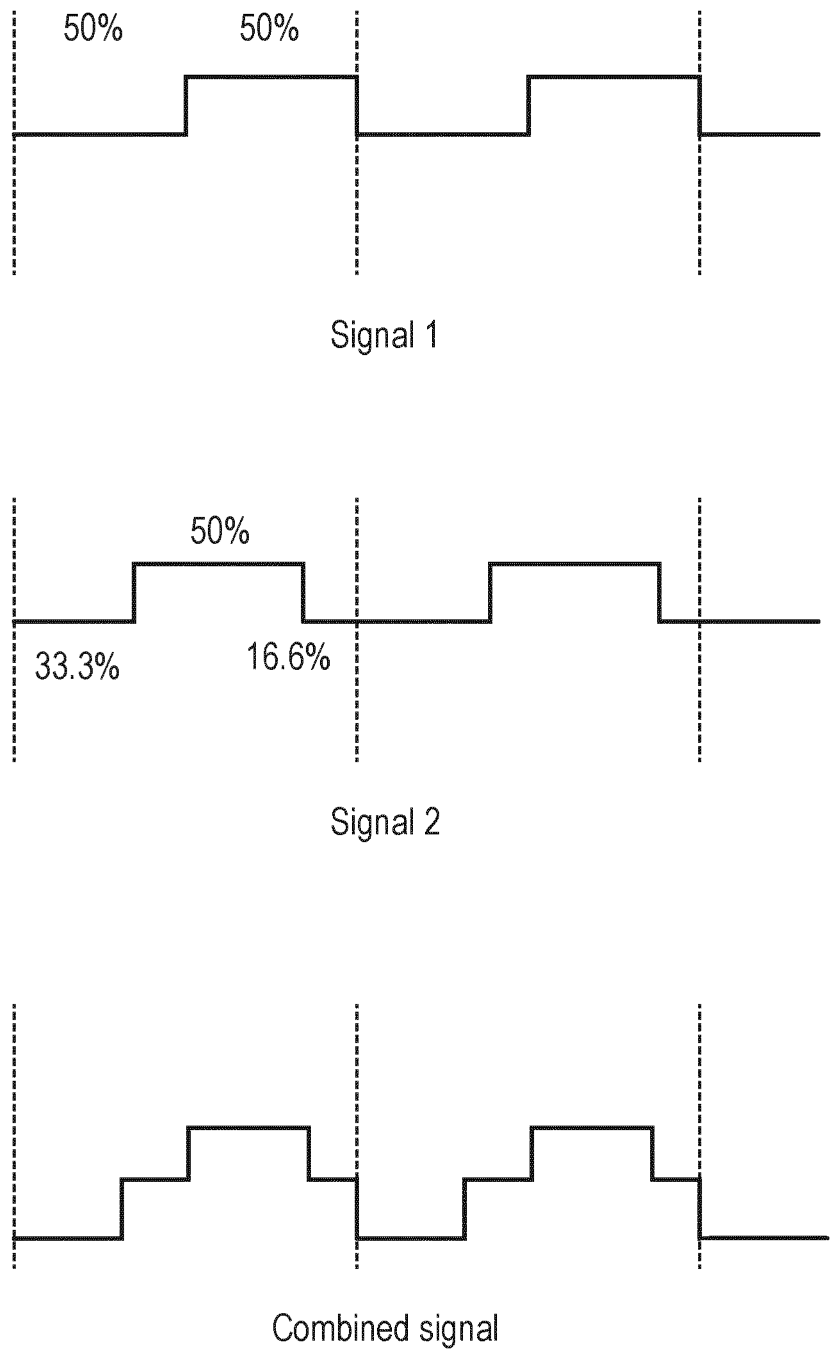
FIG. 9 is an example representation of combining two signals with a relative phase offset to create a combined signal, in accordance with an aspect of the present disclosure.

FIG. 9 shows an example where both signal 1 and signal 2 are 1:1 duty cycle signals with the same frequency, but one signal has a phase offset relative to the other. The clock generation circuit may be configured to generate a 1:1 duty cycle signal and then create signal 1 and/or signal 2 by applying a suitable delay to the signal, thereby arriving at signal 1 and signal 2 with a suitable phase offset between them. As can be seen from FIG. 9, when signal 1 and signal 2 are combined, an approximation to a sine wave signal is achieved.

Signal 1 and signal 2 may be used to module the laser(s) 110, $610_n$ and the 1:1 duty cycle signal may be used to control the accumulation timing of the image sensor 120 (i.e., the demodulation signal) in the same way as described earlier with reference to FIGS. 5 to 8. In an alternative, signal 1 and signal 2 may be used to control the accumulation timing of the image sensor 120 (i.e., the demodulation signal) and the 1:1 duty cycle signal may be used to drive the laser 110, as described earlier with reference to FIGS. 7 and 8.

Whilst in this example two signals are combined to approximate the sine signal, it will be appreciated that any number of signals with appropriate phase offsets (optionally also with different duty cycles) may be combined to approximate a sine signal. Typically, the larger the number of signals that are being combined, the more closely the combined signal may approximate a sine signal and have a greater reduction in harmonics, but the more complex the signal generation and control may be. Therefore, the number of signals that are used may be chosen based on the requirements of the ToF camera system.

When signals 1 and 2 are used serially to drive the light source or control image sensor demodulation (eg, when they are time divided) in the same way as described with reference to FIGS. 7 and 8 above, each of signals 1 and 2 may be used for the same amount of time during each accumulation period (for example, as represented in FIGS. 7 and 8). This is true regardless of whether signals 1 and 2 are being used to drive the laser 110, or to control accumulation timing of the image sensor. However, in an alternative implementation, the relative amount of time for which each signal is used may be varied, in order to provide distortion compensation.

Furthermore, in each of the examples described above, each signal (eg, signal 1, signal 2, etc) has an equal and constant amplitude. In both the duty cycle and phase offset implementations described above, in addition or as an alternative to varying the amount of time for which each signal is used, the amplitude of at least one of the signals may be different to the other signals and/or the amplitude of one or more signals may be varied, in order to provide distortion compensation or more accurately approximate a sine wave in the combined signal.

Furthermore, it will be appreciated that the phase offset and duty cycle implementations described above may be combined such that a sine wave is approximated using two or more signals with different phase offset and duty cycle.

Figure 10:
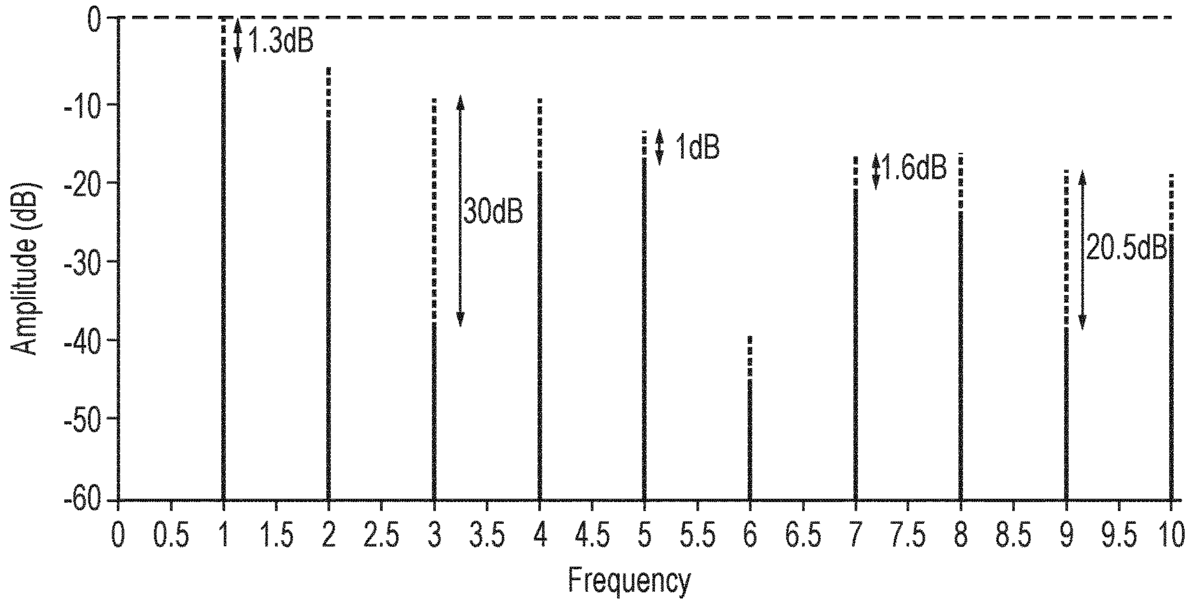
FIG. 10 shows an example of a reduction in harmonic content in accordance with an aspect of the present disclosure.

FIG. 10 shows one non-limiting example of how approximating a sine signal with two or more square wave signals may reduce the amplitude of the harmonics compared with a pure square wave. In this specific example, the third harmonic is reduced by 30 dB, the fifth harmonic by 1 dB, the $7^{th}$ harmonic by 1.6 bD and the $9^{th}$ harmonic by 20.5 dB. As a result, the noise caused by odd numbered harmonics that may fold back to the fundamental frequency should be reduced. Therefore, square wave signals may be used to drive/control the ToF camera system whilst still maintaining an acceptable level of noise in the depth measurements performed by the system. Furthermore, it may be possible to reduce the amount of oversampling performed in the determination of a depth frame (for example, from four times oversampling to two or three times oversampling) since the harmonics that may fold back into the fundamental frequency are smaller in amplitude and therefore less of a concern. This may improve the speed of operation of the system and/or reduce power consumption. It will be appreciated that this is merely one example of an improvement in harmonic reduction that may be achieved according to the present disclosure. Different degrees of improvement may be realised depending on which of the different techniques are used to approximate a sine wave and the extent to which a pure sine wave is approximated.

Throughout this disclosure, the term "electrically coupled" or"electrically coupling" encompasses both a direct electrical connection between components, or an indirect electrical connection (for example, where the two components are electrically connected via at least one further component).

The skilled person will readily appreciate that various alterations or modifications may be made to the above described aspects of the disclosure without departing from the scope of the disclosure.

The image sensors described above may be a single ended pixel or differential pixel define (for example, a CMOS single ended or differential sensor design). Therefore, it will be appreciated that each pixel readout may either be single ended or differential. In the above all of the above examples, two or more signals are combined (by various different means) in order to synthesise/approximate a sine wave. It will be appreciated that the degree to which a sine wave is approximated may depend on the number of signals that are combined. Therefore, it will be understood that the combined signal is not a pure sine wave, but is a signal that has reduced harmonic content compared with each of the signals that are combined (for example, a pure square wave signal). As such, it will be understood that all of the disclosed examples are techniques for operating at least part of a ToF imaging system using two or more signals (for example, square wave signals) which, when combined, result in a signal with reduced harmonic content compared with each of the signals that have been combined. Consequently, the timing and/or phase offset and/or duty cycle ratio of the two or more signals may be set in any suitable way to achieve any desired combined signal type that as a reduced harmonic content compared with the original signals (an approximated sine wave signal being merely one example of such a combined signal).

It will further be appreciated that in the above, square wave signals (which could also be described as rectangular wave signals) are used and these may be particularly useful given the relative ease of generation and control. However, the two or more signals to be combined may be of any other suitable type, for example trapezoidal, etc.

The invention claimed is:

1. A system comprising:

a light emission unit comprising:

at least one light source; and two or more drivers coupled to the at least one light source, each configured to output a respective drive signal to the at least one light source to drive the at least one light source to emit light;

a controller coupled to the light emission unit and configured to control a timing and a modulation of the two or more drive signals, wherein the controller is configured to output to the light emission unit a first modulated control signal and a second modulated control signal, the first modulated control signal and the second modulated control signal each having a fundamental component at a fundamental frequency and one or more harmonic components at one or more harmonic frequencies, and wherein the light emission unit is configured to emit light having a modulation resulting from a combination of the first modulated control signal and the second modulated control signal, the modulation of the output light having a fundamental component at the fundamental frequency and one or more harmonic components at the one or more harmonic frequencies, wherein an amplitude of at least one of the harmonic components of the output light is less than an amplitude of corresponding harmonic components of the first modulated control signal and the second modulated control signal, and wherein the first modulated control signal has a first duty cycle ratio and the second modulated control signal has a second duty cycle ratio that is different from the first duty cycle ratio.

2. The system of claim 1, wherein a phase of the first modulated control signal is offset relative to the second modulated control signal.

3. The system of claim 1, wherein the first modulated control signal and the second modulated control signal are square wave signals or trapezoidal wave signals.

4. The system of claim 1, wherein the output light has a periodic oscillating modulation, oscillating between two energy levels and at least one intermediate energy level.

5. The system of claim 1, wherein the two or more drivers-units comprise:

a first driver configured to output a first drive signal to the at least one light source; and a second driver configured to output a second drive signal to the at least one light source.

6. The system of claim 5, wherein the at least one light source comprises a single light source coupled to the first driver and the second driver, and wherein the light emission unit is configured to combine the first drive signal and the second drive signal and drive the single light source using the combined signal.

7. The system of claim 5, wherein the at least one light source comprises:

a first light source coupled to the first driver such that the first light source is driven by the first drive signal; and a second light source coupled to the second driver such that the second light source is driven by the second drive signal.

8. The system of claim 7, wherein the light emission unit further comprises a diffuser through which light emitted by the first light source and the second light source passes.

9. The system of claim 5, wherein the controller is configured to:

control the light emission unit to emit light for a first amount of time;

output the first modulated control signal to the first driver for the first amount of time; and output the second modulated control signal to the second driver for the first amount of time.

10. The system of claim 5, wherein the controller is configured to:

control the light emission unit to emit light for a first amount of time;

output the first modulated control signal to the first driver and output the second modulated control signal to the second driver for a first portion of the first amount of time; and output the first modulated control signal to the second driver and output the second modulated control signal to the first driver for a second portion of the first amount of time.

11. A time of flight, ToF, camera system comprising:

a light emission unit;

an image sensor configured to image light emitted from the light emission unit and reflected by an object to be imaged; and a controller coupled to the light emission unit and the image sensor, the controller being configured to:

apply a modulated light control signal to the light emission unit for a first amount of time to cause the light emission unit to output modulated light for the first amount of time;

control charge accumulation of the image sensor for a first portion of the first amount of time using a first modulated signal; and control charge accumulation of the image sensor for a second portion of the first amount of time using a second modulated signal, wherein the first modulated signal and the second modulated signal have different duty cycle ratios.

12. The ToF camera system of claim 11, wherein the first portion of the first amount of time and the second portion of the first amount of time together span an entirety of the first amount of time.

13. The ToF camera system of claim 11, wherein the controller is further configured to:

control charge accumulation of the image sensor for a third portion of the first amount of time using the first modulated signal; and control charge accumulation of the image sensor for a fourth portion of the first amount of time using the second modulated signal.

14. The ToF camera system of claim 13, wherein the first portion of the first amount of time, the second portion of the first amount of time, the third portion of the first amount of time and the fourth portion of the first amount of time together span an entirety of the first amount of time.

15. The ToF camera system of claim 11, wherein the different duty cycle ratios of the first modulated signal and the second modulated signal are such that a combined signal, formed by combining the first modulated signal and the second modulated signal, has lower amplitude harmonic content than the modulated light control signal.

16. A system comprising:

a light source;

a controller coupled to the light source and configured to control the light source to emit modulated light for a first amount of time, wherein the controller is configured to:

control the light source to emit light with a first modulation signal for a first portion of the first amount of time, the first modulation signal having a first duty cycle ratio; and control the light source to emit light with a second modulation signal for a second portion of the first amount of time, the second modulation signal having a second duty cycle ratio that is different to the first duty cycle ratio, wherein the duty cycle ratios of the first modulation signal and the second modulation signal are such that at least one harmonic in a combined signal formed by combining the first modulation signal and the second modulation signal has a lower amplitude than corresponding harmonic content in the first modulation signal and the second modulation signal.

17. The system of claim 16, wherein the first portion of the first amount of time and the second portion of the first amount of time together span an entirety of the first amount of time.

18. The system of claim 16, wherein the controller is further configured to:

control the light source to emit light with the first modulation signal for a third portion of the first amount of time; and control the light source to emit light with the second modulation signal for a fourth portion of the first amount of time.

19. The system of claim 18, wherein the first portion of the first amount of time, the second portion of the first amount of time, the third portion of the first amount of time and the fourth portion of the first amount of time together span an entirety of the first amount of time.

20. The system of claim 16, further comprising a driver, wherein the controller is coupled to the light source by the driver.

21. The system of claim 16, wherein the system is a ToF camera system and further comprises an image sensor for light emitted from the light source and reflected by an object being imaged.

* * * * *